UNITED STATES PATENT OFFICE.

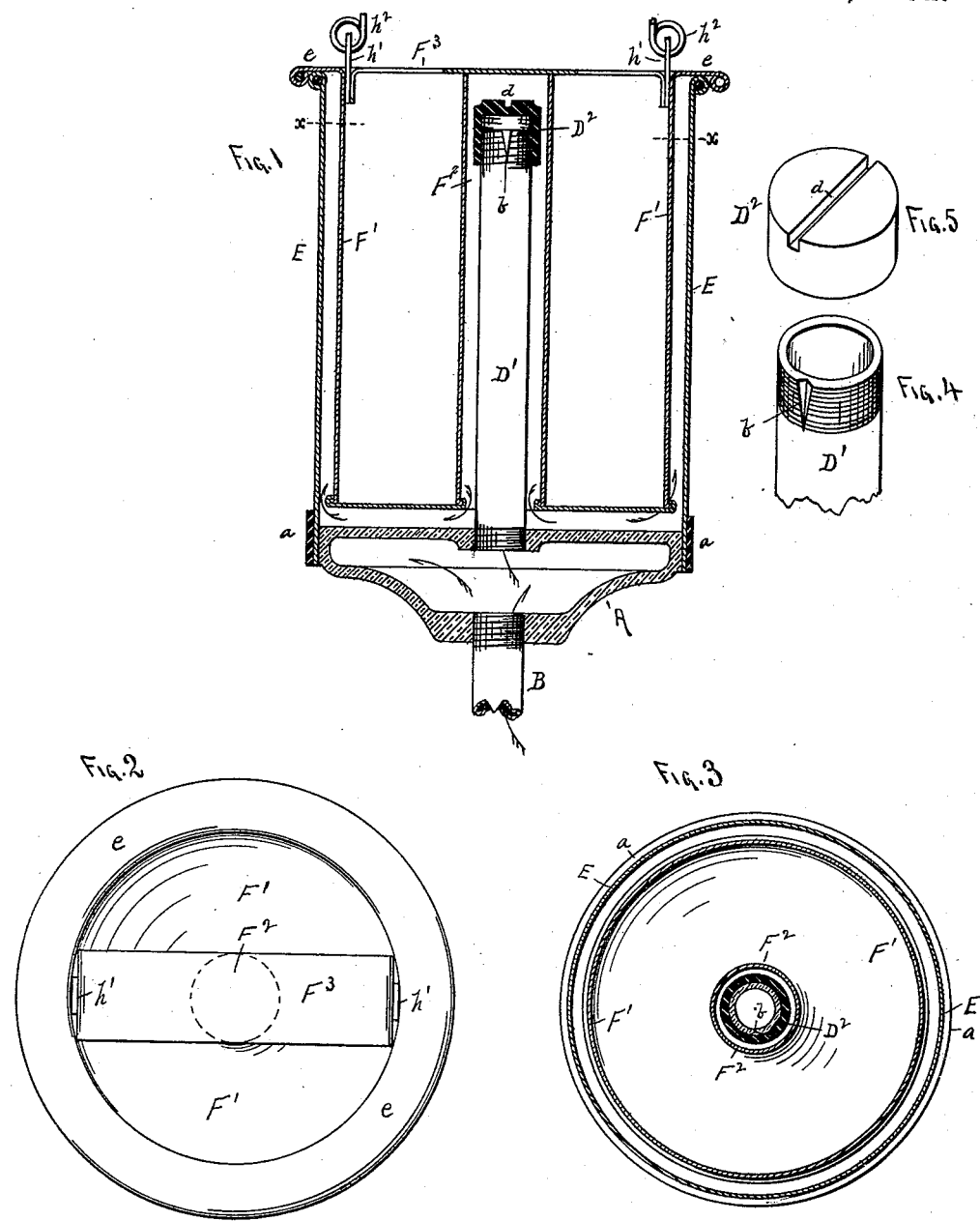

JOHN LUGER, SR., OF NORTH ST. PAUL, MINNESOTA.

GLUE-HEATER.

SPECIFICATION forming part of Letters Patent No. 484,032, dated October 11, 1892.

Application filed January 19, 1892. Serial No. 418,598. (No model.)

*To all whom it may concern:*

Be it known that I, JOHN LUGER, Sr., a citizen of the United States, residing at North St. Paul, in the county of Ramsey and State of Minnesota, have invented certain new and useful Improvements in Heaters for Glue and other Substances, of which the following is a specification.

This invention relates to apparatus for heating glue and other substances; and it consists in the construction, combination, and arrangement of parts, as hereinafter shown and described, and specifically pointed out in the claims.

In the drawings, Fig. 1 is a sectional side elevation, and Fig. 2 is a plan view. Fig. 3 is a cross-sectional view on the line $x\,x$ of Fig. 1. Figs. 4 and 5 are enlarged perspective views of one end of the steam-feed tube and the adjustable cap detached.

A represents a hollow base, preferably of cast-iron, into the bottom of which the steam-supply pipe B leads and from the top of which rises the steam-feed tube $D'$, as shown. Upon the upper end of this feed-tube $D'$ is a screw-cap $D^2$, fitting down over the end of the tube for some distance, and in the side of the upper end of the same tube is formed a small cavity $b$, out through which the steam will be free to escape when the cap $D^2$ is elevated. The cavity $b$ is wedge-shaped, as shown, so that its area increases as the cap is elevated. The cap will be deep enough so that when screwed down entirely it entirely closes the cavity $b$ and prevents the escape of any of the steam. By this simple means a larger or smaller quantity of the steam may be permitted to escape from the tube $D'$ or be shut off entirely. The cap will preferably be provided with a slot $d$ for the insertion of a screw-driver, as that will be the most convenient implement with which to actuate the cap. Supported upon this base A is the outer shell or casing E, being held in place by a metal ring $a$, and within this casing is supported by its rim $e$ the receptacle $F'$ for the glue being formed with a central tube $F^2$ to fit over the feed-tube $D'$ and cap $D^2$, as shown.

Across the top of the receptacle $F'$ is shown a plate $F^3$, which performs the double function of a top to the central tubular part $F^2$ and also a strengthening-plate to support the latter in place in the receptacle. The ears $h'$ for the bail $h^2$, by which the receptacle may be lifted from the casing, are also shown connected to the receptacle at the same point as the cross-plate $F^3$. By this simple means the supply of steam may be perfectly controlled and only so much allowed to escape into the space between the casing E and receptacle as shall be sufficient to keep the glue in the receptacle at the required temperature. If an increased heat is required, it may easily be obtained by turning the cap $D^2$ upward until a larger area of the vent $b$ is exposed, or the heat may be decreased or shut off entirely by turning the cap downward. The escaping steam will supply sufficient moisture to the air within the casing E, so that a water-bath will not be required to surround the receptacle.

I claim an important advantage by forming the receptacle $F'$ with the central tubular section $F^2$ to fit over the tube $D'$, as the heat from the escaping steam when first radiated comes into contact with the contents of the receptacle at the center, and then the steam, passing downward and upward around the receptacle, reaches every part of its surface, thereby greatly increasing the effective force of the steam and economizing its use.

Having thus described my invention, what I claim as new is—

1. A heater for glue and similar substances, consisting of a hollow base A, into which steam is adapted to be fed, a casing E, supported upon said base, and a receptacle $F'$, suspended from said casing, and means whereby a sufficient quantity of steam may be allowed to enter the space surrounding said receptacle to generate the requisite quantity of heat, substantially as and for the purpose set forth.

2. A heater for glue and similar substances, consisting of a hollow base A, into which steam is adapted to be fed, and supporting a casing E, a feed-tube $D'$, rising from said base into the interior of said casing and provided with means for regulating the escape of the steam therefrom, a receptacle $F'$, adapted to fit into said casing and having central tubular section F² fitting over said feed-tube, and a closed top, whereby the escaping steam comes first in contact with the central portion of said receptacle and is then carried downward and ascends around the outside thereof, substantially as and for the purpose set forth.

In testimony whereof I have hereunto set my hand in the presence of two subscribing witnesses.

JOHN LUGER, Sr.

Witnesses:
C. N. WOODWARD,
H. S. WEBSTER.